(No Model.) 3 Sheets—Sheet 1.
J. H. BUNNELL & C. J. KINTNER.
IMPLEMENT FOR DISCHARGING LIQUIDS IN FORM OF A STREAM.
No. 599,383. Patented Feb. 22, 1898.
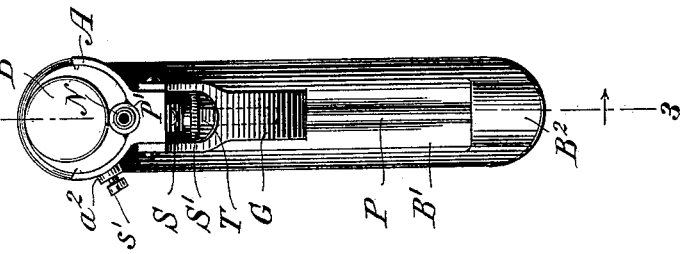
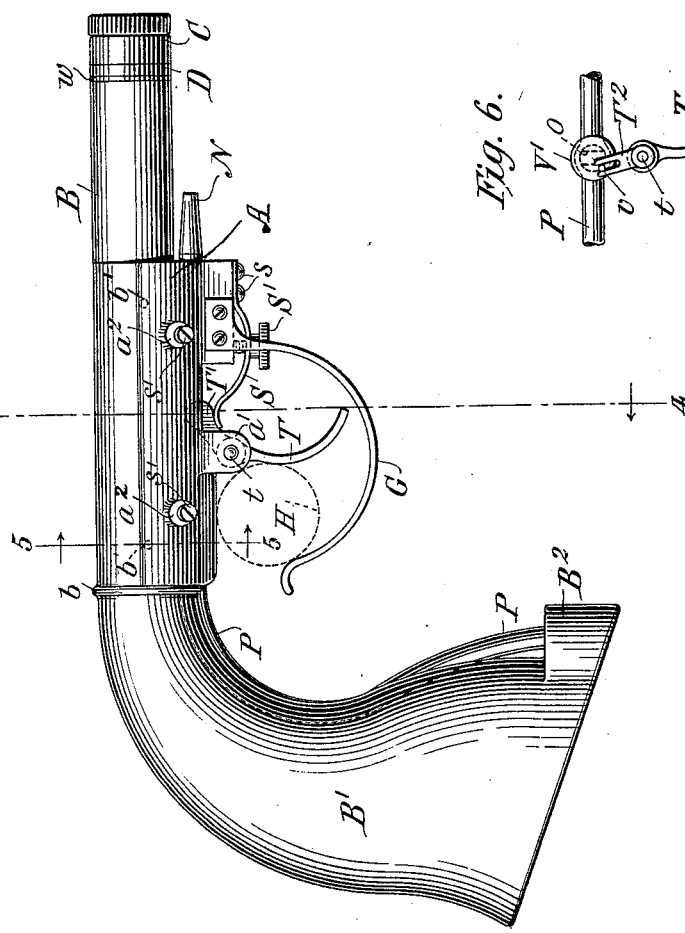
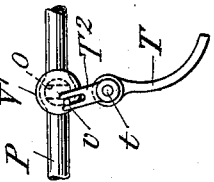
WITNESSES:
C. E. Ashley
M. M. Robinson
INVENTORS
Jas. H. Bunnell
Charles J. Kintner
By Attorney
Charles J. Kintner (No Model.) 3 Sheets—Sheet 2.
J. H. BUNNELL & C. J. KINTNER.
IMPLEMENT FOR DISCHARGING LIQUIDS IN FORM OF A STREAM.
No. 599,383. Patented Feb. 22, 1898.
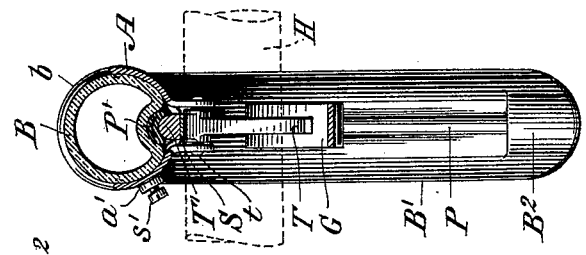
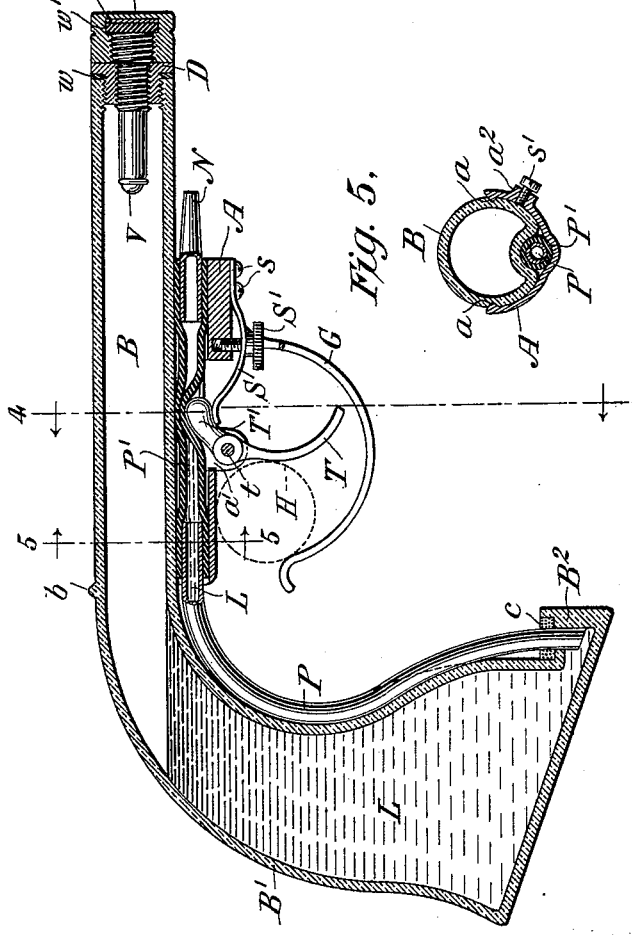
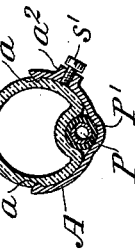
WITNESSES:
C. E. Ashley
M. M. Robinson
INVENTORS
Jesse H. Bunnell
Charles J. Kintner
By Attorney
Charles J. Kintner (No Model.) 3 Sheets—Sheet 3.
J. H. BUNNELL & C. J. KINTNER.
IMPLEMENT FOR DISCHARGING LIQUIDS IN FORM OF A STREAM.
No. 599,383. Patented Feb. 22, 1898.
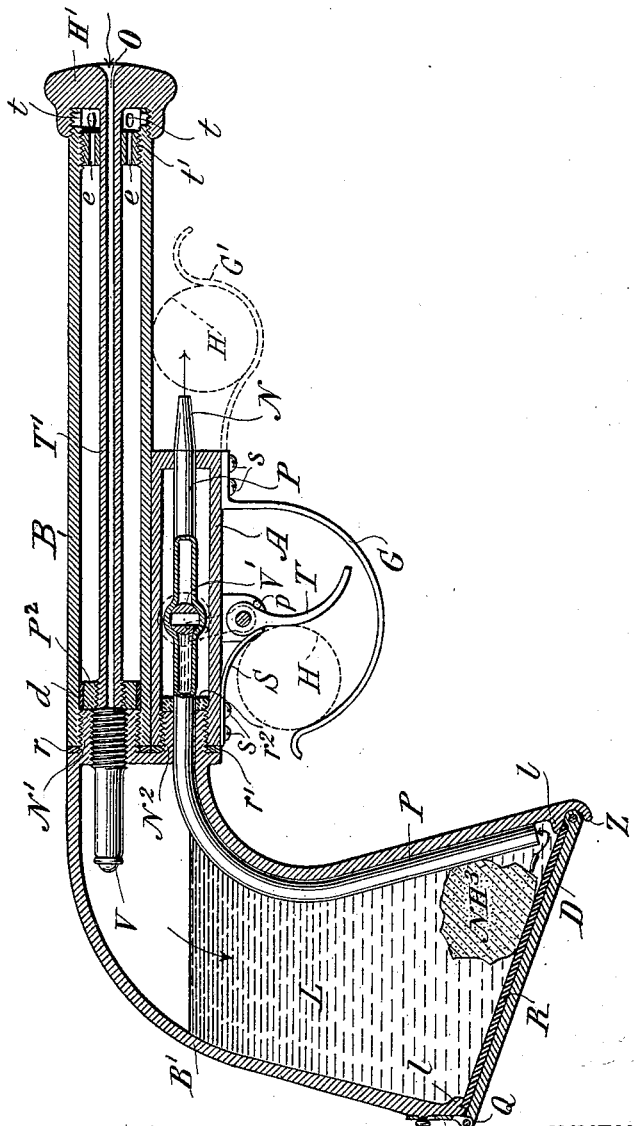

UNITED STATES PATENT OFFICE.

JESSE H. BUNNELL, OF BROOKLYN, AND CHARLES J. KINTNER, OF NEW YORK, N. Y.

IMPLEMENT FOR DISCHARGING LIQUIDS IN FORM OF A STREAM.

SPECIFICATION forming part of Letters Patent No. 599,383, dated February 22, 1898.

Application filed February 2, 1897. Renewed October 4, 1897. Serial No. 654,040. (No model.)

*To all whom it may concern:*

Be it known that we, JESSE H. BUNNELL, residing at Brooklyn, in the county of Kings, and CHARLES J. KINTNER, residing at New York, in the county of New York, State of New York, citizens of the United States, have made a new and useful Improvement in Implements for Throwing or Discharging Liquids in the Form of a Stream, of which the following is a specification.

Our invention is directed to portable implements of the nature indicated, and is especially adapted for use in connection with bicycles or by persons desiring to defend themselves against the attacks of savage dogs or vicious persons, and is herein illustrated and described in the specific form of a pistol, although it may take other forms in its application, as will be hereinafter more particularly described.

The invention will be fully understood by referring to the accompanying drawings, in which—

Figure 1 represents a side elevational view of one form of our novel implement. Fig. 2 is an end elevational view as seen looking at Fig. 1 from right to left. Fig. 3 is a vertical longitudinal sectional view taken on the line 3 3, Fig. 2, and as seen looking at that figure from left to right in the direction of the arrows. Fig. 4 is a transverse sectional view taken through Figs. 1 and 3 on the lines 4 4 and as seen looking at those figures in the direction of the arrows from right to left, a part of the handle-bars of a bicycle being shown in dotted lines supporting the implement in the several views shown in Figs. 1, 3, and 4. Fig. 5 is a transverse sectional view taken on the lines 5 5, Figs. 1 and 3, and as seen looking at those figures from left to right in the direction of the arrows; and Fig. 6 is a detail side elevational view of a modified form of valve or cock and controlling-trigger therefor. Fig. 7 is a longitudinal sectional view of a modified form of the implement, illustrating also a novel form of pump attached thereto.

Referring now to the drawings in detail and first to Figs. 1 to 5, inclusive, B' represents a containing-chamber, preferably in the form of a pistol and shown in the figures just referred to as of a single piece of glass, metal, or the like, the major portion of said containing-chamber being the grip part of the apparatus and designed to hold a liquid L, as ammonia, in solution. The outer end of this chamber is screw-threaded interiorly for the purpose of receiving, through the agency of a screw-head D, the ordinary form of bicycle-valve V used in connection with the inflation of bicycle-tires, $w$ being a rubber or equivalent washer or packing for the purpose of rendering the junction between the part D and the barrel B of the chamber B' absolutely air-tight.

C is a screw-threaded cap containing in its inner surface the usual packing $w'\,w^2$, which seals and. protects the outer end of the valve V.

P is a curved tube, preferably of metal, adapted to fit within a groove in the front side of the grip and to have its lower end extend to the extreme bottom on the inner side of the containing-chamber and sealed therein by any sealing material $c$, the free end of the tube lying in close proximity to the barrel portion B of the chamber and being surrounded by a soft-rubber tube P', the other end of which in turn surrounds a nozzle N. The free end of the tube P, the rubber tube P', and nozzle N are held firmly compressed in a groove on the under side of the barrel B by a metallic shield A of substantially semicircular form, said shield having lateral lugs or ribs $a\,a$, adapted to be slid endwise into corresponding grooves in the sides of the barrel B until it (the shield) abuts against a bead $b$, extending around the barrel. (See Figs. 1 and 5.) This part A is of sufficient thickness at its front end to act as a support for a trigger-guard G and is provided near its center with side lugs or ears $a'\,a'$, which pivotally support by a pivot-pin $t$ a trigger T, the upper end T' of which is of such curvilinear structure in cross-section as to effectually pinch or squeeze the soft-rubber tube P' when held in its forward position under the influence of the strong retractile spring S, secured to the forward part of the shield A by screws $s$, S' being an adjustment-screw located between the forked ends of the trigger-guard, as clearly shown in Figs. 2 and 3, for the purpose of regulating the pressure of the spring S upon the part T' of the trigger T.

$a^2\ a^2$ are external projections in one side of the shield A, having internal screw-threads adapted to receive set-screws $s'\ s'$ for the purpose of securing the shield A firmly in position.

It will be noticed that the rear end of the trigger-guard G is curved upward and outward. This is for the purpose of affording a yielding catch or support for the device when carried or supported by the handle-bars H of an ordinary bicycle.

The parts of the apparatus having been put together in the manner indicated, its operation is as follows: The cap C and valve V are unscrewed from the free end of the barrel B, and sufficient water or other liquid—such as ammonia in solution—is placed therein, as indicated by the letter L, Fig. 3. The valve V is now restored to its former position and rendered air-tight by securing it against the washer or packing $w$, after which an ordinary bicycle-pump is attached in the usual manner and operated so as to fill the barrel B with air under pressure, the adjustment of the trigger T T' having been first effected by the spring S and set-screw S'. The bicycle-pump is then removed and the cap C screwed firmly home, as shown in Figs. 1 and 3. The apparatus is now ready for use and is operated by simply holding it after the manner of a pistol and actuating the trigger T T', thereby allowing the compressed air to force the liquid L forward through the tube P and out at the nozzle N after the manner of well-known forms of bottle-siphons, the arrangement being such that when the apparatus is held in the ordinary position for use the compressed air will always tend to force the liquid L toward the bottom of the chamber B' upward and outward through the tubes P P' and nozzle N. After the implement is filled and charged, as described, when it is desired to use it in connection with a bicycle the rider simply hangs it on the handle-bars H by the trigger-guard G, where it is of ready access for him or her in the event of being attacked by dogs or vicious persons.

In the modified form shown in Fig. 7 the grip part B' and barrel part B are cast or blown, as before, in one solid piece with two screw-necks $N'\ N^2$, the lower or base portion being open and provided with a door D, hinged at Z, said door having on its inner surface a rubber or other pliable surface R, adapted, when closed, to abut snugly against an internally-projecting bead or lip $l$, L' being a latch hinged to the door at Q, and K a lug or button integral with the grip part B', the arrangement being such that when the door is closed and the latch secured firmly in position the interior chamber will be air and water tight. In this form of the apparatus the tube P is of one solid piece and extends into the barrel part B through the screw-neck $N^2$, its outer end being held or sustained by a shield A, which is slipped over the tube and screw-threaded to the neck $N^2$, said shield having side openings for receiving a rotary valve or cock V', snugly fitting within an expanded portion of the tube P, the trigger T being pivotally secured at $t$ and having an arm $T^2$ slitted to receive a pin $v$ at the outer end of the cock or valve V'. (See Fig. 6.) S is the trigger-spring, secured to the part A by screws $s$ and adapted to hold the trigger in its forward position against a stop $p$, secured to one of the lugs or ears to which it (the trigger T) is pivoted. G is the trigger-guard, secured, as before, to the part A and constitutes, as in the first instance, a spring-actuated support for the implement around an ordinary bicycle-handle H; or, if preferred, this support may extend in reverse direction, as shown in dotted lines at G', said support in this instance being split or forked at its outer or free end to admit of the passage of the liquid between said forks; or this holding device in either of the modified forms, if preferred, may be attached to the upper side of the grip or barrel and have the appearance of the trigger of an ordinary pistol. With this modified form of the invention we have provided a pump which is designed to be permanently secured to the outer end of the barrel part B by screw-threads, which secure it to the screw-neck N' and in alinement with the valve V, which is permanently secured in said screw-neck. This pump, as herein disclosed, is of valveless form, and consists of a barrel part with a hollow piston-rod T', having a piston $P^2$, provided with packing $d$ and a bearing $t'$ at its outer end screw-threaded in the inner surface of the barrel. This bearing $t'$ has openings $e$ to admit of the escape of air as the piston P' is drawn out. The outer end of the piston-rod T' is in the form of a head H', screw-threaded interiorly and adapted to be secured, when not in use, by exterior screw-threads on the outer end of the barrel. The barrel of the pump is secured to the screw-neck N' by screw-threads, as shown, $r$ and $r'$ being rubber or analogous packing-rings, and $r^2$ a seal between the pipe P and screw-neck $N^2$ to render it water and air tight. In the use of this modified form of the apparatus the liquid is placed in the grip or base portion through the door D, after which it is closed, and, if preferred, salts of ammonia ($NH_3$) or any other material may be placed within the liquid. The handle portion H' of the piston-rod T' is unscrewed from the barrel of the pump and the piston drawn out until $P^2$ comes into mechanical contact with the bearing $t'$. The palm of the hand is then placed firmly over the opening O, so as to render it air-tight, and the piston-rod forced inward, thereby causing air to enter the chamber through the valve V. This operation is continued until the desired pressure is attained in the barrel part B above the liquid L in the containing-chamber B'. This modified form of the implement is used, as before, by actuating the trigger T and causing the rotary cock or valve V' to rotate until its valve-opening o is in alinement with the interior of the tube P, when the liquid will flow out under pressure in the direction of the arrows and between the forks of the holding or sustaining device G'.

We do not limit ourselves to the particular form of apparatus herein shown and described for throwing or discharging liquids under pressure for the purpose of frightening away dogs or vicious persons, as we believe it is broadly new with us to utilize compressed air and a liquid to eject the same from a containing vessel upon the principle embodied in the ordinary bottle-siphons of commerce, and in the application of this generic principle lies the essence of our invention without regard to any special form of apparatus so long as the same be portable and controlled by a valve within easy access of the user.

We believe it is also broadly new with us to devise an implement for throwing liquids in the form of a stream, in which implement is combined a liquid-retaining chamber adapted to contain the liquid under pressure and a stream-directing nozzle constituting a part of the implement, together with a valve, a cock, or retainining means for preventing the outflow of the liquid until the latter is actuated by the user, the whole being so arranged that it may be used with a single hand as a weapon of defense after the manner of a pistol, so as to direct the stream on aiming the implement to the point where it is desired to utilize the liquid ejected.

We are aware that a portable implement for discharging liquids in the form of a spray has heretofore been devised, consisting of a fluid-retaining chamber having means for subjecting the fluid to pressure in combination with a short section of hose attached to the bottom thereof and provided with a sprinkling or spraying nozzle and a trigger-controlled valve, as disclosed in United States Patent to Joseph Amor and Alfred J. Lane, No. 226,588, granted April 20, 1880, and we make no claim hereinafter broad enough to include such a structure, that apparatus being devised for spraying poisonous liquids, while our implement is of a portable nature, designed to be operated by the user as a weapon of defense and so arranged that accurate aim may be taken and the liquid thrown to a distance from a concentrating-nozzle which will throw a stream.

Having thus described our invention, what we claim, and desire to secure by Letters Patent of the United States, is—

1. A portable implement for throwing or discharging liquids in the form of a stream, consisting of a water and air tight containing-chamber having a tube extending from the bottom thereof upward and forward to a point near the top of the chamber, in combination with means for exerting pressure upon the liquid in the containing-chamber and a valve controlled by a trigger and adapted to regulate the flow of the liquid through the tube, substantially as described.

2. A portable implement for throwing or discharging liquids in the form of a stream, consisting of a water and air tight chamber having the conformation of a pistol with a tube extending to a point near the bottom of the grip portion of the chamber upward and forward beneath the barrel thereof, said chamber being provided with detachable means for admitting water and compressed air, in combination with means for regulating the flow of the liquid through the tube, and a trigger for controlling said regulating means, substantially as described.

3. A portable implement for throwing or discharging liquids in the form of a stream, consisting of a hollow chamber having a grip or holding portion adapted to contain a body of liquid, means at the upper portion of said grip part for admitting air under pressure above the surface of a liquid within the grip portion, a tube extending from the bottom of the grip portion upward and forward, and means for controlling the flow of liquid through the tube, substantially as described.

4. A portable implement for throwing or discharging liquids in the form of a stream, consisting of a hollow chamber having a grip portion for holding liquid, and a barrel portion for holding air under pressure above said liquid portion, in combination with a tube extending from the extreme bottom of the grip portion upward and forward under the barrel portion, and provided with means for regulating the flow of liquid through the tube at the will of the user, substantially as described.

5. A portable implement for throwing or discharging liquids in the form of a stream, consisting of a chamber of pistol-like conformation having a tube extending from the bottom portion of said chamber upward and forward in the direction of the barrel thereof, in combination with means controlled by a trigger for regulating the flow of liquid through the tube, substantially as described.

6. A portable implement for throwing or discharging liquids in the form of a stream, consisting of an air-tight containing-chamber having the conformation of a pistol and adapted to hold liquid under pressure, a tube one end of which is located at or near the bottom of the grip portion of the containing-chamber, its free end being provided with a nozzle located at a point near the top of the containing-chamber, in combination with means controlled by a trigger for regulating the flow of the liquid to and through the nozzle, and additional means as an air-pump for forcing air into the chamber, substantially as described.

7. A portable implement for throwing or discharging liquids in the form of a stream, consisting of a chamber of pistol-like form, and a tube having one end located near the bottom of said chamber, its other end being provided with a nozzle, in combination with means controlled by a trigger for regulating the flow of liquid through the tube and nozzle, and an air-pump which constitutes the barrel of the implement, said air-pump being secured thereto by screw-threads, substantially as described.

8. A portable implement for throwing or discharging liquids in the form of a stream, consisting of a liquid-containing chamber provided with a door or opening for receiving the liquid, and a tube for discharging the liquid, in combination with an air-pump secured to the upper portion of the chamber and constituting the barrel thereof together with means controlled by a trigger for controlling the flow of liquid through the tube, said door or opening being provided with means for securing it in position so as to constitute the chamber air and water tight, substantially as described.

9. A portable implement for throwing or discharging liquids in the form of a stream, consisting of a containing-chamber of pistol-like conformation having means for forcing the liquid through a nozzle, in combination with means for detachably securing it the implement to the handle or frame of a bicycle, substantially as described.

10. A portable implement for throwing or discharging liquids in the form of a stream, consisting of a containing-chamber of pistol-like conformation adapted to contain a liquid under pressure, in combination with a liquid-conveying tube having means controlled by a trigger for regulating the flow of the liquid, together with means for detachably securing the implement to the handle of a bicycle, substantially as described.

11. A portable implement for throwing or discharging liquids in the form of a stream, consisting of a containing-chamber having the conformation of a pistol, in combination with a curved tube the inner end of which extends to a point near the bottom of the grip portion thereof with its outer end extending to a point near the top of the grip portion and substantially parallel with the barrel thereof, substantially as shown and described.

12. A portable implement for throwing or discharging liquids in the form of a stream, consisting of a water and air tight chamber having the conformation of a pistol, in combination with a stream-directing nozzle constituting a part thereof, together with means adapted to be actuated by the finger of the user for preventing the outflow of the liquid except when actuated, all of said parts being so arranged that the user may take accurate aim while holding the implement in one hand, substantially as described.

13. A portable implement for throwing or discharging liquids in the form of a stream, consisting of a water and air tight chamber of a conformation or form adapted to be grasped by the hand of the user and having a stream-directing nozzle communicating directly with the interior thereof, in combination with a trigger and means controlled thereby for regulating the flow of liquid through the nozzle, substantially as described.

14. A portable implement for throwing or discharging liquids in the form of a stream, consisting of a chamber adapted to hold or retain the liquid under pressure, in combination with a stream-directing nozzle operatively connected thereto by an elastic or rubber tube, together with a trigger provided with means for compressing or pinching the rubber tube in such manner as to normally prevent the outflow of the liquid, substantially as described.

15. A portable implement for throwing or discharging liquids in the form of a stream, consisting of a containing-chamber, a stream-directing nozzle and a compressible tube uniting said nozzle with the interior of the chamber, in combination with means controlled by a trigger for normally compressing said tube, substantially as described.

16. A portable implement for throwing or discharging liquids in the form of a stream, consisting of a chamber adapted to hold or retain the liquid, said chamber being provided with a compressible ejection-tube, in combination with means for normally compressing said tube and preventing the outflow of the liquid, substantially as described.

In testimony whereof we have hereunto subscribed our names this 1st day of February, 1897.

JESSE H. BUNNELL.
CHARLES J. KINTNER.

Witnesses:
M. G. MILLER,
M. M. ROBINSON,